(12) United States Patent
Braun

(10) Patent No.: US 10,506,760 B2
(45) Date of Patent: Dec. 17, 2019

(54) MULCHER WITH SHIFTABLE CHOPPING BLADE ROTORS

(71) Applicant: Braun Maschinenbau GmbH, Landau (DE)

(72) Inventor: Stefan Jacob Braun, Schiffweiler (DE)

(73) Assignee: BRAUN MASCHINENBAU GMBH, Landau (DE)

( * ) Notice: Subject to any disclaimer, the term of this patent is extended or adjusted under 35 U.S.C. 154(b) by 0 days.

(21) Appl. No.: 15/460,862

(22) Filed: Mar. 16, 2017

(65) Prior Publication Data

US 2018/0263183 A1   Sep. 20, 2018

(51) Int. Cl.
*A01D 34/78* (2006.01)
*A01D 34/66* (2006.01)
*A01D 34/00* (2006.01)

(52) U.S. Cl.
CPC .......... *A01D 34/78* (2013.01); *A01D 34/005* (2013.01); *A01D 34/66* (2013.01); *A01D 34/661* (2013.01)

(58) Field of Classification Search
CPC .... A01D 34/005; A01D 34/008; A01D 34/78; A01D 34/76; A01D 69/02; A01D 34/66; A01D 34/661
USPC ...................................................... 56/10.2 R
See application file for complete search history.

(56) References Cited

U.S. PATENT DOCUMENTS

| | | | | |
|---|---|---|---|---|
| 4,707,971 A * | 11/1987 | Forpahl | ................ | A01D 34/866 180/41 |
| 5,204,814 A * | 4/1993 | Noonan | ............... | A01D 34/008 180/168 |
| 6,026,635 A * | 2/2000 | Staiger | ................ | A01D 34/685 56/295 |
| 6,591,593 B1 * | 7/2003 | Brandon | ............. | A01D 34/006 56/10.6 |
| 2002/0156556 A1 * | 10/2002 | Ruffner | ................ | A01B 69/008 701/23 |
| 2004/0144075 A1 * | 7/2004 | Jackson | ................ | A01D 34/13 56/257 |
| 2012/0091929 A1 * | 4/2012 | Kusakawa | ................ | H02P 7/29 318/139 |
| 2013/0152535 A1 | 6/2013 | Roberge | | |
| 2013/0268165 A1 * | 10/2013 | Hashima | ............... | B60W 10/30 701/50 |
| 2014/0137528 A1 * | 5/2014 | Schygge | .................. | B60K 1/04 56/10.7 |

FOREIGN PATENT DOCUMENTS

| | | | | |
|---|---|---|---|---|
| DE | 29804575 U1 | 5/1993 | | |
| DE | 9400882 U1 * | 1/1995 | .......... | A01B 63/023 |
| DE | 202004007717 U1 | 9/2004 | | |

* cited by examiner

*Primary Examiner* — Alicia Torres
(74) *Attorney, Agent, or Firm* — Lucas & Mercanti, LLP; Klaus P. Stoffel

(57) ABSTRACT

An apparatus (mulcher) for keeping down groundcover between parallel rows of plants, especially rows of wine grape or fruit plants, with two chopping blade rotors rotating in one and the same plane, each around an axis perpendicular to the ground. The distance between the rotational axes is adjustable in a direction perpendicular to the plant rows even though the rotational areas of the chopping blade rotors may overlap. A separate electric motor is assigned to each of the chopping blade rotors, and devices are provided to control the electric motor so that that collisions between the chopping blade rotors are avoided.

11 Claims, 2 Drawing Sheets

MULCHER WITH SHIFTABLE CHOPPING BLADE ROTORS

BACKGROUND OF THE INVENTION

The invention pertains to an apparatus for keeping down the groundcover between parallel rows of plants, in particular rows of wine grape or fruit plants, with two chopping blade rotors rotating in one and the same plane, each around an axis perpendicular to the ground, wherein the distance between the rotational axes perpendicular to the plant rows is adjustable even though the areas in which the chopping blade rotors rotate may overlap.

Apparatuses of this type, so-called mulchers, are known through use. The chopping blade rotors of these known mulchers, intended to be coupled to small tractors, are driven by a shaft connected to the tractor. The rotation of this power take-off shaft is first transmitted to a hex shaft by a central gearbox of the mulcher and then by the hex shaft to the gearboxes of the mulcher assigned to the chopping blade rotors. When the distance between the rotational axes of the chopping blade rotors is adjusted, these gearboxes shift along the hex shaft together with the chopping blade rotors.

When accidents occur, especially collisions of the individual blades of the chopping blade rotors with obstacles on the ground, the gearboxes assigned to the chopping blade rotors are put at risk. In cases where the chopping blade rotors rotate in one and the same plane, slip clutches between the chopping blade rotors and the gearbox which could dampen the effects of impacts cannot be used.

SUMMARY OF THE INVENTION

The invention is based on the goal of creating a new mulcher of the type indicated above which, while of simple design, is less susceptible to breakdowns than the known mulchers.

The mulcher according to the invention which achieves this goal has a separate electric motor assigned to each of the chopping blade rotors. Furthermore, devices are provided to control the electric motor in such a way that collisions between the chopping blade rotors are avoided.

It is an advantage of the invention that it eliminates the need for complicated components to transmit a rotational movement from the tractor to the chopping blade rotors by way of several gearboxes on the mulcher. The electric drives assigned individually to the chopping blade rotors can also be more easily protected from the effects of accidents.

In a preferred embodiment of the invention, the devices for controlling the electric drive comprise means for determining the rotational angle of the rotors of the electric motors. When there is a rigid connection between the chopping blade rotor and the rotor of the electric motor by means of a rotor shaft, the rotational position of the individual chopping blade rotor can be determined by the control device and can be changed if necessary in such a way that a collision between the individual chopping blades of the chopping blade rotors, which overlap in the areas of their rotation, is avoided.

In particular, the devices for controlling the electric motors are provided to ensure that, under normal operating conditions, the individual chopping blades rotate in synchrony at a predefined, i.e., adjustable, rotational speed and at a constant rotational angle difference.

The means for determining the rotational angle can comprise sensors, which deliver signals representative of the rotational angle, or means can be provided for the sensorless determination of the rotational angles on the basis of voltages at the motors and the currents flowing through them.

In another embodiment of the invention, the devices for controlling the electric motors can comprise means for detecting when the motor has stopped. Accidents can thus be detected and possibly an alarm given.

The means for detecting a motor stoppage can be configured to differentiate the continuously detected rotational angle with respect to time, wherein the stoppage can be identified on the basis of a value of zero determined by the differentiation.

In another embodiment of the invention, the devices for controlling the electric motors are configured to control a restart of the motors after a motor stoppage by rotating the chopping blade rotors first in one direction and then in the opposite direction. It is advantageous that, in this way, an accident situation caused by an obstacle on the ground can be resolved without the direct intervention of the tractor operator.

The distance between the rotational axes of the chopping blade rotors can be adjustable hydraulically. In a preferred embodiment, an electric drive is provided to make such adjustments.

It is obvious that both the electric motors assigned to the chopping blade rotors and this electric drive can be supplied by a voltage source provided on the tractor. A separate generator, which is driven by a power take-off shaft of the tractor and which can be mounted on the tractor and/or on the mulcher, can be used as a supply voltage source.

It is advisable for the electric motors to be mounted directly on housing parts which form a housing which is open at the bottom and which is able to accommodate the chopping blade rotors, wherein the distance between the rotational axes of the chopping blade rotors is adjusted by shifting the housing parts relative to a carrier device.

The invention is explained in greater detail below on the basis of exemplary embodiments and the attached drawings, which refer to these examples.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
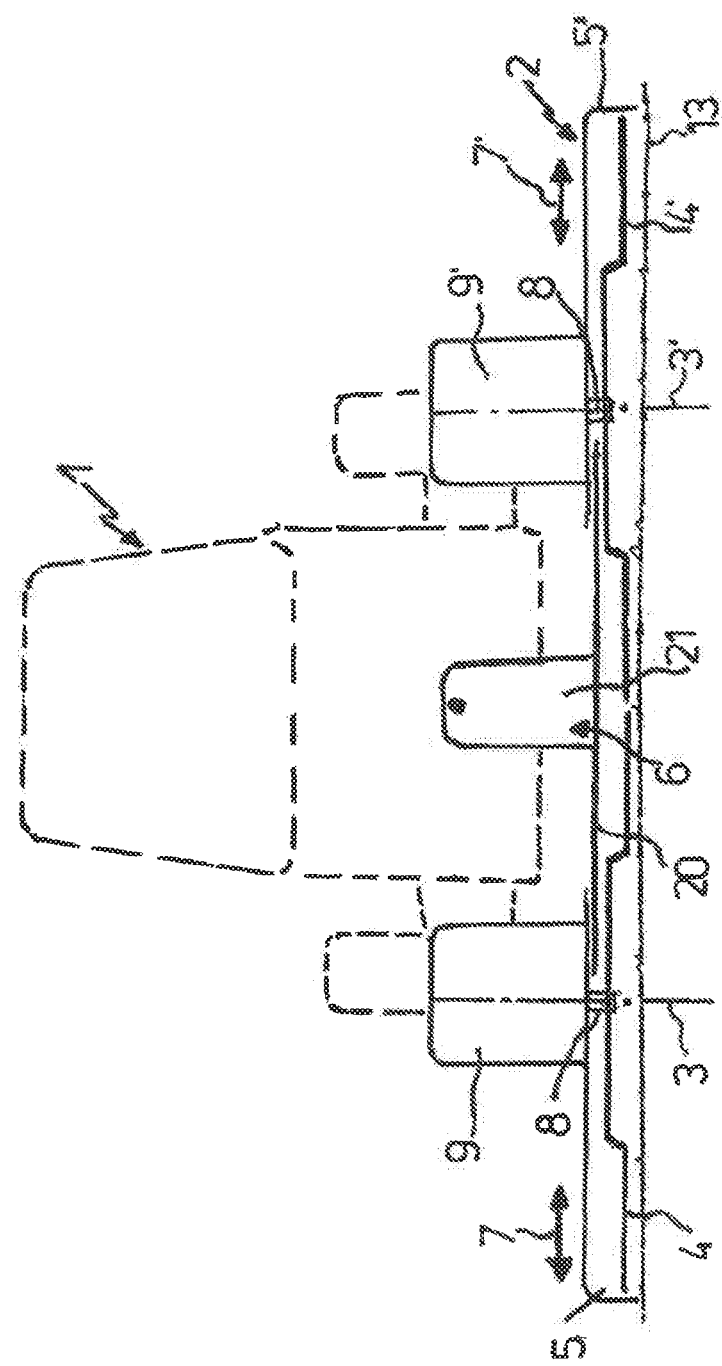
FIG. 1 shows an apparatus according to the invention coupled to a tractor.

An apparatus (mulcher) for keeping down the groundcover between parallel rows of plants, especially between rows of wine grape or fruit plants, can be coupled to a tractor 1 of suitably narrow dimensions and comprises a flat housing 2, open at the bottom, in which chopping blade rotors 4, 4' rotate around axes 3, 3' in a single plane parallel to the ground 13. Each of the chopping blade rotors 4, 4' comprises two chopping blades pointing in opposite directions.

The housing 2 comprises two housing parts 5, 5', which are shiftable relative to a carrier device 6 in a direction perpendicular to the parallel plant rows, as shown by the arrows 7, 7', the carrier device 6 being supported on the ground 13 by rollers (not shown). The carrier device 6 allows the apparatus to be connected to the tractor 1.

Hydraulic cylinders (not shown) for shifting the housing parts 5, 5' as shown by the arrows 7, 7' and rails for the guidance and support of the housing parts 5, 5' are installed on the carrier device 6, which comprises a middle plate 20 and a coupling part 21. Alternatively, the carrier device 6 could be provided with an electric drive for shifting the housing parts 5, 5'.

As FIG. 1 also shows, the chopping blade rotors 4, 4' are each connected by way of a drive shaft 8, 8', guided through the associated housing wall of the housing parts 5, 5', to a coaxial electric motor 9, 9' arranged on the housing part 5, 5'.

The electric motors 9, 9' and the above-mentioned electric drive can be supplied with operating current by the tractor 1. The tractor may in certain cases comprise a generator of greater power than that of the generators normally used, this higher-power generator possibly being driven by a power take-off shaft of the tractor; the tractor could also comprise a battery of higher-than-normal capacity.

In the exemplary embodiment shown, each of the electric motors 9, 9', which are, for example, synchronous motors, comprises a sensor, which delivers a signal representative of the rotational position of the rotor.

The horizontal distance between the rotational axes 3, 3' of the chopping blade rotors 4, 4' is to be calculated in each operating position of the apparatus in such a way that the working areas of the chopping blade rotors 4, 4' overlap in the direction perpendicular to the plant rows, i.e., perpendicular to the direction in which the tractor travels. This ensures that no uncut area remains between the chopping blade rotors. If the distance between the plant rows decreases, the cutting width is adjusted as appropriate by pushing the housing parts 5, 5' together to decrease the distance between the rotational axes 3, 3' of the chopping blade rotors 4, 4'.

Figure 2:
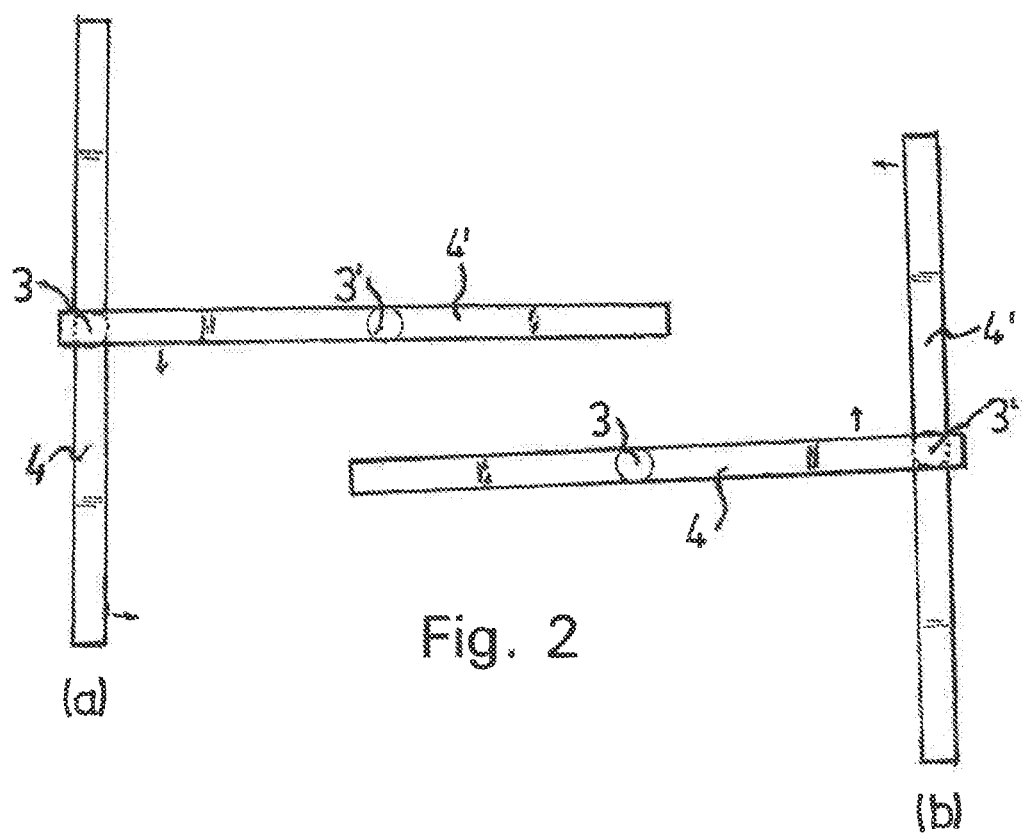
FIG. 2 shows a diagram illustrating a way in which the chopping blade rotors of the apparatus of FIG. 1 can operate.

As FIG. 2 shows, the overlapping of the working areas of the chopping blades of the chopping blade rotors 4, 4' rotating in one and the same cutting plane requires a synchronous rotation of the chopping blade rotors 4, 4' at a constant rotational angle difference of preferably 90°. Otherwise, collisions between the chopping blades would be unavoidable. FIG. 2b shows the chopping blade rotors 4, 4' after rotation by a further 90° in comparison to FIG. 2a. As FIGS. 1 and 2 make clear, a free end of each chopping blade rotor 4, 4' fits into a flattened U-shaped indentation in the other chopping blade rotor.

Figure 3:
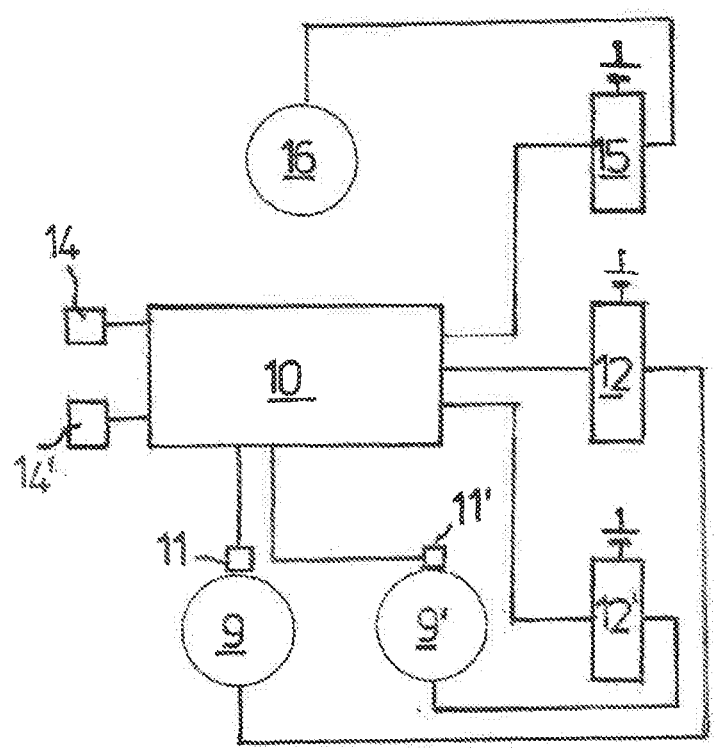
FIG. 3 shows a diagram illustrating the control of the apparatus of FIG. 1.

To control the rotation of the chopping blade rotors 4, 4' and the shifting of the cutting width of the apparatus, an electronic control unit 10 is provided, as shown in FIG. 3, which receives the signals from the rotational angle sensors 11, 11' of the electric motors 9, 9'. The control unit 10 is connected to power circuits 12, 12' for supplying the electric motors 9, 9' with current in such a way that, under conditions of synchronous rotation, a certain rotational angle difference is always maintained between the chopping blade rotors 4, 4'.

The control unit 10 also receives signals from contact sensors 14, 14', which detect plants in the rows, and generates a control signal for the shifting of the cutting width; instead of a hydraulic shifting system, a power circuit 15 for supplying an electric drive 16 with current could also be used to control the cutting width.

The control unit 10 comprises devices for evaluating the signals of the rotational angle sensors 11, 11'. In particular, by the differentiation of the continuously determined rotational angles with respect to time, it is possible to detect when a rotor has stopped. In this way, an accident situation, for example, in which one of the chopping blade rotors 4, 4' has come to a stop upon hitting a stone, can be determined. On the basis of a generated accident signal, the terminals of the electric motors 9, 9' are disconnected, so that their rotors can rotate without resistance and damage to the electric motors and to the chopping blade rotors is avoided.

In the event of an accident, the control unit 10 allows a controlled return to the operating state, i.e., to synchronous operation at a constant rotational angle difference, by starting up the rotation of the chopping blade rotors 4, 4' first in one rotational direction and then, if necessary, in the opposite direction, so that in this way a blockage by a stone can be cleared away. Only if this is not successful after rotation in both directions will it be necessary for the tractor driver to intervene directly to eliminate the cause of the accident.

A stoppage caused by blockage could also be detected by torque sensors, wherein the sensor signal can then lead, for example, to the freewheeling of an electrically actuated clutch by way of the control unit 10.

The shafts 8, 8' could also comprise a slip clutch, which can engage only in a defined rotational angle position.

While specific embodiments of the invention have been shown and described in detail to illustrate the inventive principles, it will be understood that the invention may be embodied otherwise without departing from such principles.

I claim:

1. An apparatus for keeping down groundcover between parallel rows of plants, comprising: two chopping blade rotors that are rotatable in a common plane, each around a rotational axis perpendicular to the ground, wherein a distance between the rotational axes is adjustable in a direction perpendicular to the plant rows even when rotational areas of the chopping blade rotors overlap; a separate electric motor assigned to each of the chopping blade rotors; devices for controlling the electric motors so that that collisions between the chopping blade rotors are avoided; a housing having an open bottom and which holds the chopping blade rotors, the electric motors being mounted directly and coaxially with the chopping blade rotors on housing parts of the housing; and, a carrier device that connects the housing to a vehicle, the housing parts being shiftable relative to the carrier device, only in a plane parallel to the common plane.

2. The apparatus according to claim 1, wherein the devices for controlling the electric motors comprise means for determining a rotational angle of rotors of the electric motors and/or of the chopping blade rotors.

3. The apparatus according to claim 2, wherein the devices for controlling the electric motors are configured to maintain a constant operating rotational speed and a constant rotational angle difference between the rotors or between the chopping blade rotors.

4. The apparatus according to claim 2, wherein the means for determining the rotational angle comprise sensors that deliver signals representative of the rotational angles.

5. The apparatus according to claim wherein the means for determining the rotational angle are configured for sensorless determination of the rotational angles.

6. The apparatus according to claim 1, wherein the devices for controlling the electric motors comprise means for detecting a motor stoppage.

7. The apparatus according to claim 6, wherein the means for detecting the motor stoppage comprise devices for differentiating a rotational angle of the rotor with respect to time.

8. The apparatus according to claim 1, wherein the devices for controlling the electric motors control a restart of the motors after a motor stoppage by rotating the chopping blade rotors first in one direction and then in an opposite direction.

9. The apparatus according to claim 1, wherein the distance between the rotational axes of the chopping blade rotors is adjustable hydraulically and/or by an electric drive.

10. The apparatus according to claim 1, wherein the electric motors are connectable to an operating voltage source provided on a carrier or traction vehicle.

11. The apparatus according to claim 1, wherein the housing parts are shiftable relative to the carrier device so that a distance between axes of the chopping blade rotors is adjustable by shifting the housing parts.

* * * * *